(12) United States Patent
Olivares et al.

(10) Patent No.: US 9,456,538 B2
(45) Date of Patent: Oct. 4, 2016

(54) REVERSIBLE PLOUGH

(71) Applicant: Deere & Company, Moline, IL (US)

(72) Inventors: Marco Antonio Olivares, Garza Garcia (MX); Cesar Garcia, Monterrey (MX); Mairon Gonzalez, Monterrey (MX)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/045,861

(22) Filed: Oct. 4, 2013

(65) Prior Publication Data

US 2015/0096772 A1    Apr. 9, 2015

(51) Int. Cl.
*A01B 5/08*    (2006.01)
*A01B 5/14*    (2006.01)

(52) U.S. Cl.
CPC ... *A01B 5/08* (2013.01); *A01B 5/14* (2013.01)

(58) Field of Classification Search
CPC .................................. A01B 5/08; A01B 5/14
USPC .................................................. 172/219, 220
See application file for complete search history.

(56) References Cited

U.S. PATENT DOCUMENTS

| | | |
|---|---|---|
| 2,712,278 A | 1/1883 | Dill |
| 2,764,075 A | 9/1956 | Fowler |
| 2,833,194 A * | 5/1958 | Branson .................. 172/161 |
| 3,042,120 A | 7/1962 | Heckathorn et al. |
| 3,101,788 A * | 8/1963 | Jennings .................. 172/219 |
| 3,101,789 A * | 8/1963 | Jennings .................. 172/219 |
| 3,115,191 A * | 12/1963 | Ward ....................... 172/162 |
| 3,190,365 A * | 6/1965 | Thompson ................ 172/219 |
| 3,931,858 A * | 1/1976 | North ......................... 172/63 |
| 4,165,787 A * | 8/1979 | Perkins ..................... 172/219 |
| 4,942,928 A * | 7/1990 | Gomez ..................... 172/219 |
| 4,984,638 A * | 1/1991 | Coste ....................... 172/221 |
| 5,000,267 A * | 3/1991 | Harrell ..................... 172/219 |
| 5,024,281 A * | 6/1991 | Furlough .................. 172/219 |
| 5,771,979 A * | 6/1998 | Alanis ...................... 172/219 |

* cited by examiner

*Primary Examiner* — Thomas B Will
*Assistant Examiner* — Joel F. Mitchell

(57) ABSTRACT

A reversible plough with a frame for a 3-point hitch attachment comprises a frame with lower first and second and an upper third attachment point for attachment to a 3-point hitch. A vertical pivot axle supports a plough tool carrier for pivotable movement. The upper third attachment point is located on a vertical pivot plate in a first upper pivot point. A second lower pivot point of said plate is connected to a transversel pivot axis on the frame and a third upper pivot point of said plate is connected to a control link. When the upper link of the 3-point hitch moves backwards, then the plate pivots and moves the control link backwards as well. Said control link extends towards the rear end portion of the frame and is connected to a link arrangement pivotally supported by the vertical pivot axle and connected to the plough tool carrier.

12 Claims, 6 Drawing Sheets

REVERSIBLE PLOUGH

FIELD

The disclosure relates to a reversible plough and more particularly to a reversible plough comprising a frame with a 3-point hitch attachment on a front end portion of the frame.

BACKGROUND

Reversible ploughs are well known in the prior art. They comprise a frame which is attachable to an agricultural vehicle, e.g. a tractor, and further a pivotable plough tool carrier with several plough tools like discs, blades or shares arranged on the carrier for engaging the ground. The plough tools are pivotally mounted to the carrier and can be adjusted to a desirable position in which they engage with the ground. The carrier is supported on the frame for pivotal movement on a vertically extending pivot axle and is placed in its operating positions in a horizontally diagonal oriented position, so that the tools are engaging the ground one behind another and transversely displaced to each other. When pivoting the carrier from its one operating position into its other operating position the plough tools are changing their ground engaging orientation into a reverse position. Several arrangements for automation have been made including the arrangement of hydraulic controls for changing the carrier operating position. However, hydraulic components are costly and therefore not affordable to all customers, so mechanically controlled solutions are still required. Nevertheless, there is still need for easy to use solutions, without the need to leave an operator station, comprising mechanical links for providing a control for an operator to change the carrier without any major efforts and without the need for manual, time consuming adjustments to the carrier or the plough tools. Although some solutions are already known in the prior art there is still some need for improvement with respect to facilitating maintenance, number of parts, complexity and easy operation of said mechanical links.

SUMMARY

In order to provide an improved reversible plough with respect to the above mentioned criteria it is proposed to use a reversible plough with a frame for a 3-point hitch attachment on a front end portion of the frame. The frame comprises a horizontal, transverse front frame support carrying lower first and second attachment points for attachment to a first and a second lower link of a 3-point hitch and carrying, at a central location between the first and second attachment points, an upright support to which a lower end of a vertical pivot plate assembly is mounted for pivoting about a horizontal transverse pivot axis. An upper third attachment point for attachment to a third upper link of said hitch is located at an upper front location of the pivot plate assembly. A vertical pivot axle is located on a rear end portion of the frame and supports a plough tool carrier for pivotable movement around said axle. The upper third attachment point can be connected to the upper link of a 3-point hitch of a tractor. An upper rear pivot point of the vertical plate assembly is connected to a first end of a control link. Therefore, when the 3-point hitch of a tractor is operated to lift the plough, the rearward end of the upper link of the 3-point hitch moves forward and with it the third attachment point, then the vertical plate assembly pivots and moves the control link forward as well. The control link extends towards the rear end portion of the frame and is connected to a link arrangement. The link arrangement is pivotally supported by the vertical pivot axle and is connected to the plough tool carrier.

In one embodiment of the invention the link arrangement may comprise a bushing which is arranged on the vertical axle for pivotal movement. The bushing is rigidly connected to a substantially horizontal control plate and to a control arm overlapping the control plate, with both extending from the bushing towards the front end of the frame and therefore extending between the vertical axle and the control link. The control arm is connected to the plough tool carrier and moves the carrier when being pivoted by pivotal movement of the bushing and the control plate. The control plate comprises a guide slot and the control link is connected to the control plate by way of a fastener located in the rear end of the control link and received for sliding in the guide slot. For controlling the control plate it is proposed to arrange the guide slot in a generally transverse direction and symmetrically oriented to both sides of a longitudinal axis of the plough tool carrier. Further, the guide slot is placed a distance from the vertical axle and has a first and a second slot end, respectively spaced equal distances from the vertical axle, so that the first and second slot ends are building a triangular arrangement with the center point of the pivot axle. This enables the control link to provide the bushing with a certain torque around the vertical axle when applying a force on the control plate on one of the slot ends. Due to the rigid connection between the control plate, the bushing and the control arm, a bell crank is formed and the control arm will transfer the torque on the bushing into a control force for pivoting the carrier.

The slot ends may each comprise a notch for a snap-in engagement of the control link with the control plate when sliding within the guide slot from one slot end to the opposite slot end. So, when lifting the plough for pivoting the plough tool carrier, the tractor 3-point hitch is raised resulting in forward movement of the upper third attachment point for the 3-point hitch and in forward pivotal movement of the vertical pivot plate assembly carrying the upper third attachment point, whereby a drag force is created sliding the control link from one slot end notch into an opposite one of the slot end notches and pulling on the control plate in order to pivot the control plate about the pivot axle and create the force in the control arm necessary to pivot the carrier. When lowering the plough back to the ground, the movement of the tractor 3-point hitch will cause the vertical plate assembly to pivot rearwardly and the drag force on the control link will be turned into a compression force, so that the control link will be pushed out of the one slot end notch and slidably moved along the guide slot into the opposite slot end notch.

In a further embodiment the frame comprises an arcuate frame portion on which one end of the plough tool carrier is slidably supported so that the one end of the plough tool carrier moves slidably along the arcuate frame portion when pivoting from one operation position into a reverse operation position. Further, a latch mechanism is provided in order to control the start of a pivot movement when lifting the plough.

DETAILED DESCRIPTION

Figure 1:
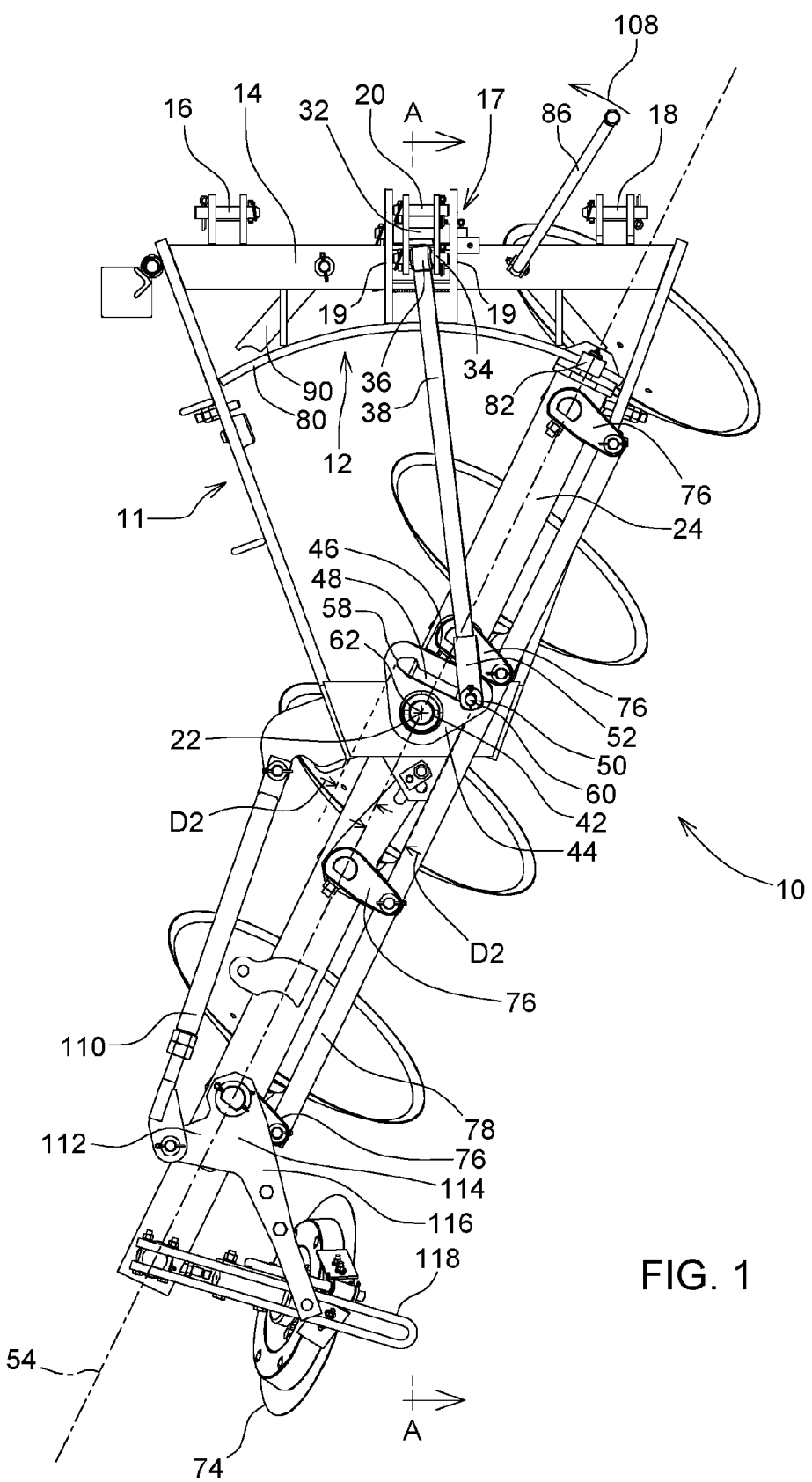
FIG. 1 shows a top view of a reversible plough according to one embodiment in a first operating position.

With respect to FIGS. 1, 2 and 4 to 6, a reversible plough 10 comprises a frame 11 including a front end portion 12 having a horizontal, transverse support member 14 supporting a lower first attachment point 16 and a lower second attachment point 18 for attachment to left and right lower links of an agricultural tractor 3-point hitch (not shown) and an upper third attachment point 20 for attachment to a third upper link of said hitch (not shown).

A vertical pivot axle 22 is located on a rear end portion of the frame 11 and supports a plough tool carrier 24 for pivotable movement around said axle 22.

Figure 2:
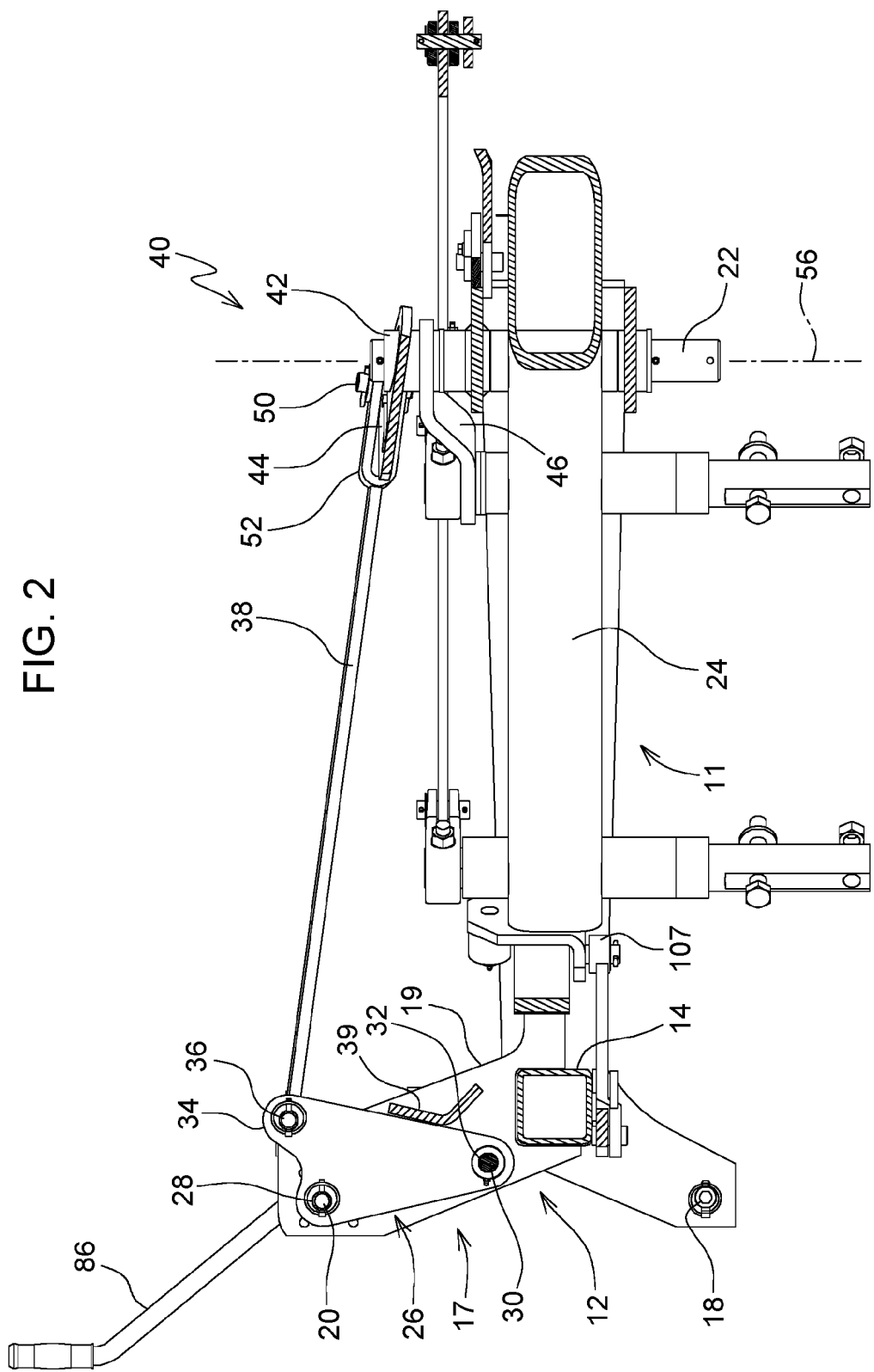
FIG. 2 shows a cross-sectional side view of the reversible plough along a cross-section plane A-A in FIG. 1.

As best shown in FIG. 2, an upright mast 17 comprising a parallel pair of plates 19 is mounted to a lateral middle location of the support member 14. The upper third attachment point 20 is located at an upper front corner of a substantially triangular, vertical pivot plate assembly 26 and is defined by a first upper pivot pin 28 on which the pivot plate assembly 26 and therefore the frame 11 of the plough 10 can be connected to the upper link of a 3-point hitch of a tractor (not shown). A second lower pivot pin 30 of said vertical plate assembly 26 is connected to a lower region of the mast 17 and defines a transverse pivot axis 32 on the frame 11 about which the vertical plate assembly 26 may pivot fore-and-aft, and a third upper pivot pin 34 is located at an upper rear corner of said vertical plate assembly 26 and is connected to a first end 36 of a control link 38. Therefore, when the upper link of the 3-point hitch (not shown) moves forward, and with it the third attachment point 20, then the vertical plate assembly 26 pivots around its lower pivot pin 30 moving the control link 38 forward as well, noting that the rearward pivoting of the plate assembly 26 is prevented by a stop member 39 in the form of an angle member fixed horizontally between the plates 19 of the mast 17 and having a leg engaging a back side of the plate assembly 26.

Figure 3:
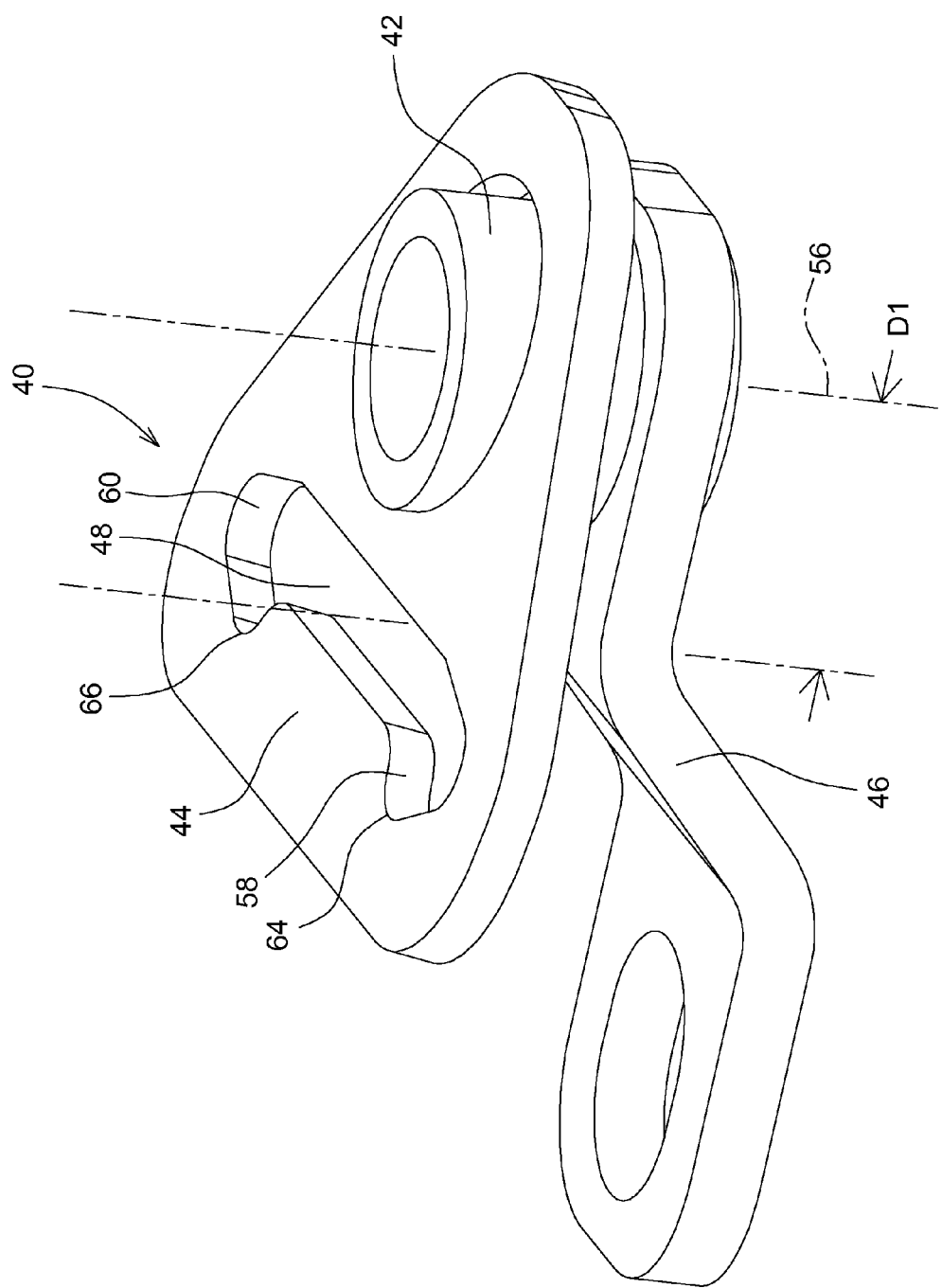
FIG. 3 shows a side perspective view of a link arrangement for pivoting a plough tool carrier of the reversible plough in FIG. 1.
Figure 4:
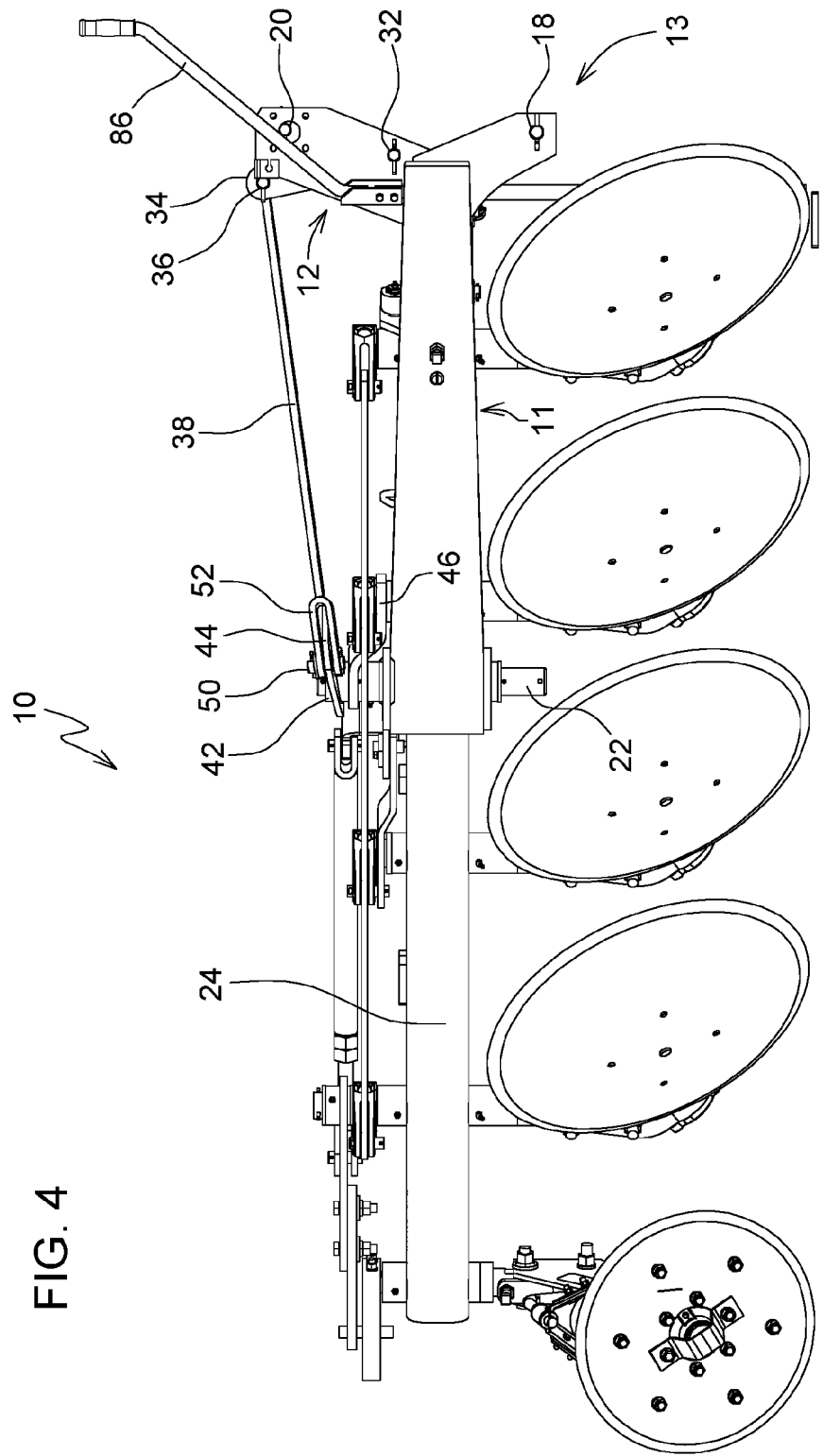
FIG. 4 shows a first side view of the reversible plough in FIG. 1.
Figure 5:
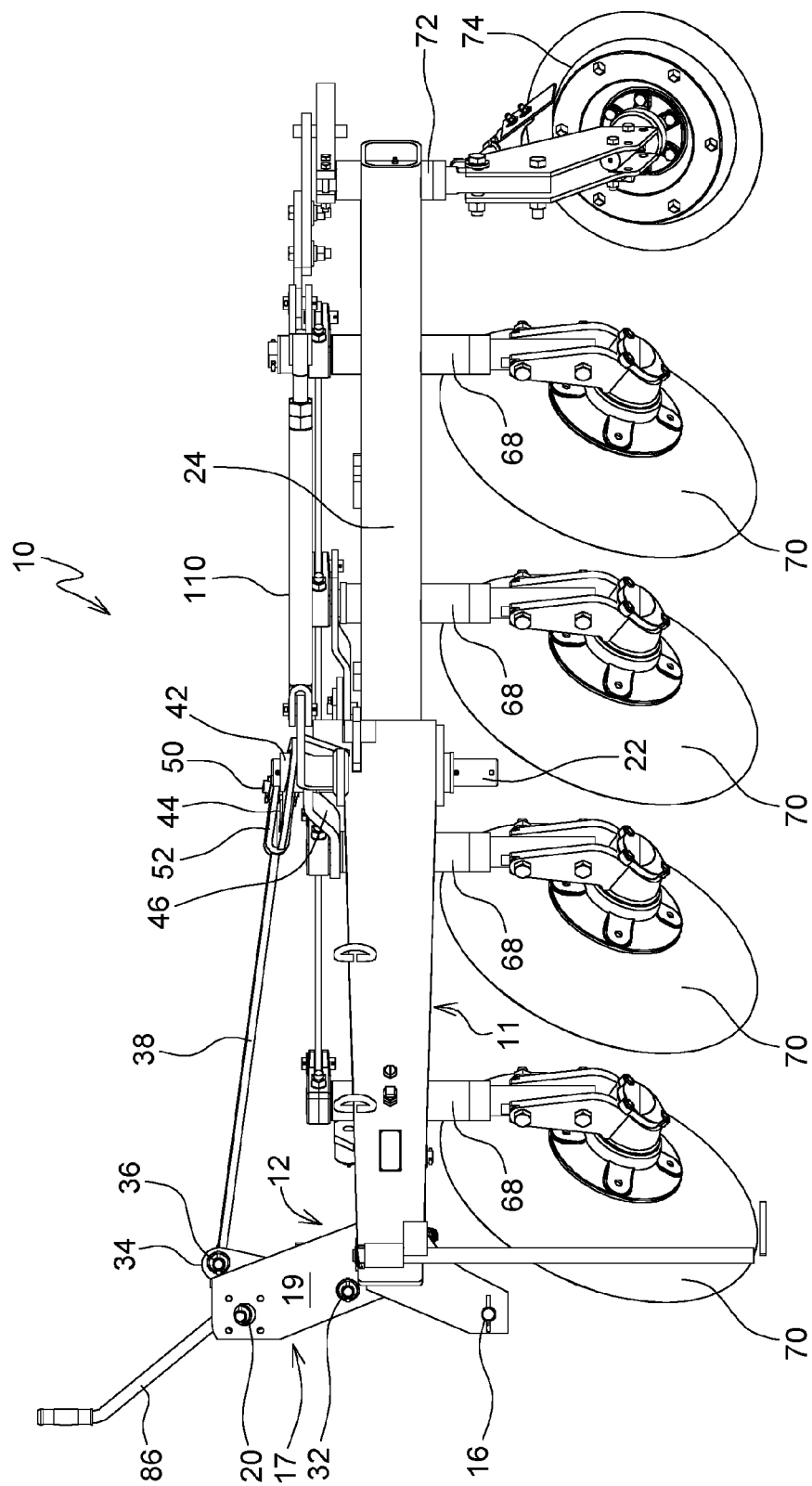
FIG. 5 shows a second side view of the reversible plough in FIG. 1

The control link 38 extends towards the rear end portion of the frame 11 and is connected to a link arrangement 40 defining a bell crank, as shown in detail in FIG. 3. The link arrangement 40 includes a bushing 42 pivotally supported by the vertical pivot axle 22 for pivotable movement. The bushing 42 is rigidly connected to a control plate 44 and a control arm 46, both extending from said bushing 42 towards the front end of the frame 11, and therefore extending between the vertical axle 22 and the control link 38. As best shown in FIG. 2, the control arm 46 is connected to the plough tool carrier 24 and moves the carrier 24 around the vertical pivot axle 22 when being pivoted by the pivoting movement of the bushing 42 and the control plate 44.

The control plate 44 comprises a guide slot 48 and the control link 38 is slidably connected to the control plate by a bolt 50 slidably placed in the guide slot 48 and supported by a fork-shaped end 52 of the control link 38.

As best shown in FIGS. 1 and 3, for controlling the control plate 44 the guide slot 48 is arranged in a generally transverse direction to a longitudinal axis 54 (shown in FIG. 1) of the plough tool carrier 24 and symmetrically extending to both sides of said longitudinal axis 54. Further, the guide slot 48 is placed a distance D1 (shown in FIG. 3) to a rotational axis 56 of the vertical pivot axle 22 and has a first and a second slot end 58, 60, each arranged a distance D2 to the rotational axis 56 of the vertical pivot axle 22, so that the first and second slot ends 58, 60 are building a triangular arrangement with a center point 62 of the vertical pivot axle 22 or the rotational axis 56, respectively. This enables the control link 38 to provide the bushing 42 with a certain torque around the vertical axis 56 when applying a force on the control plate 44 on one of the slot ends 58, 60. Due to the rigid connection between the control plate 44, the bushing 42 and the control arm 46, the control arm 46 transfers a torque on the bushing 42 into a control force for pivoting the plough tool carrier 24.

Each of the slot ends 58, 60 comprises a notch 64, 66 for a snap-in engagement of the control link 38 with the slot ends 58 or 60, respectively. In other words, when the bolt 50 of the control link 38 is sliding along the guide slot 48 and moving from one slot end 58, 60 to the opposite slot end 60, 58, respectively, the bolt snaps into the notch 64 or 66 on arrival. Therefore, when lifting the plough 10 for pivoting the plough tool carrier 24, the pivot plate assembly 26 pivots forwardly and a drag force is created moving the control link 38 into the one of the slot end notches 64, 66 and pulling on the control plate 44 in order to create the pivotal movement of the plough tool carrier 24. When placing the plough 10 back to the ground the drag force on the control link 38 will be turned into a compression force, so that the bolt 50 on the control link 38 will move out of the notch 64 or 66 respectively, and slide along the guide slot 48 into a position within the opposite slot end 60 or 58, respectively.

The plough tool carrier 24 comprises several pivot supports 68 along the longitudinal axis 54 supporting plough tools 70 in form of discs. On the end of the plough tool carrier 24 a further support 72 is located for supporting a gauge wheel 74. The pivot supports 68 are connected to each other with pivot arms 76 attached to a control link 78 for keeping the orientation of the support pivots 68 aligned to each other. The control arm 46 is attached to the pivot support 68 in front of the vertical pivot axle 22, so that the control arm 46 can act on the pivot support 68 with a control force for pivoting the plough tool carrier 24 around the vertical pivot axle 22.

The frame 12 further comprises an arcuate frame portion 80 on which a front end 82 of the plough tool carrier 24 is slidably supported so that the front end 82 of the plough tool carrier 24 moves slidably along the arcuate frame portion 80 when moving from one operating position into a reverse operating position.

Figure 6:
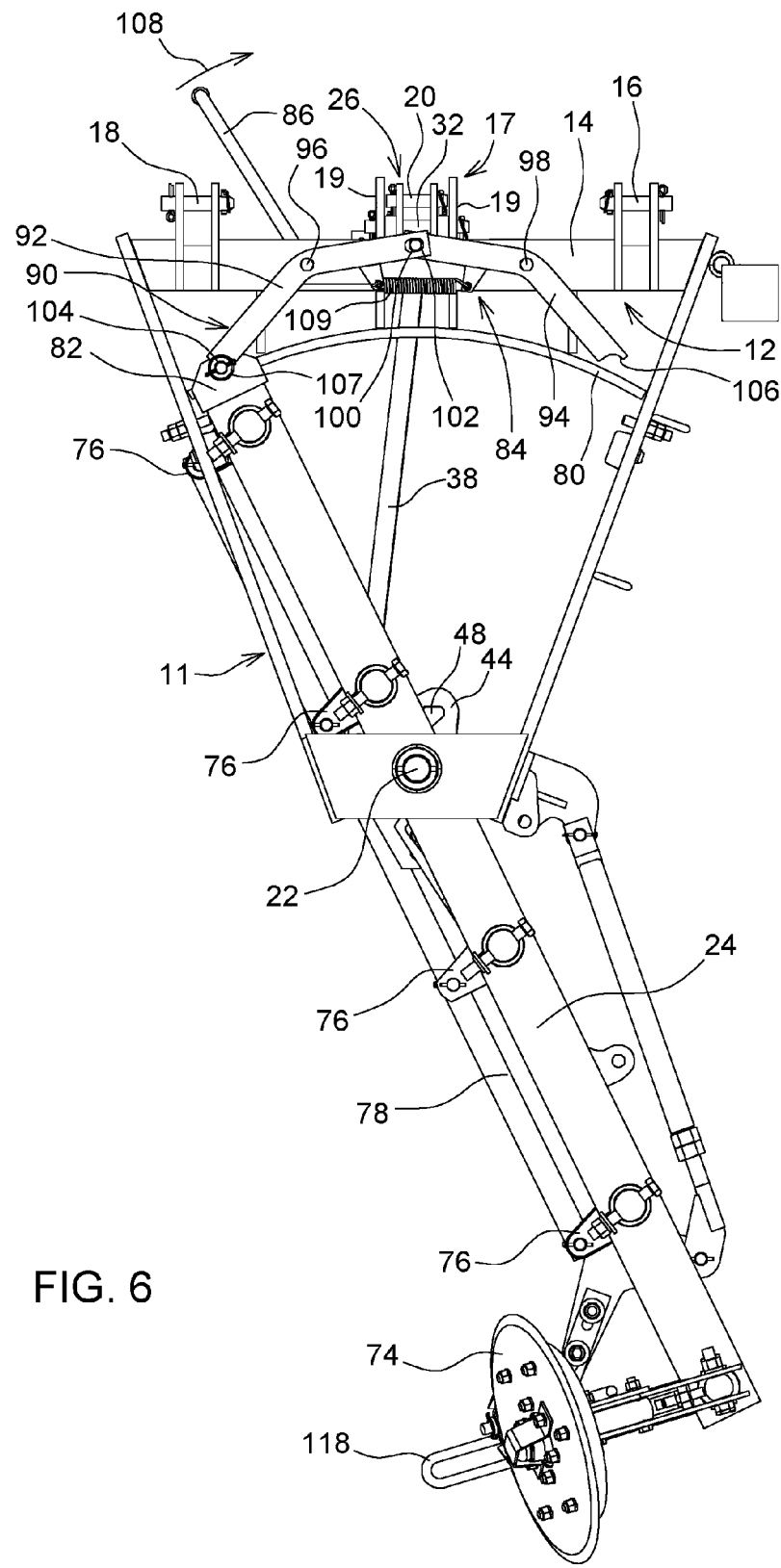
FIG. 6 shows a bottom view of the reversible plough in FIG. 1.

As best shown in FIG. 6, a latch mechanism 84 is provided in order to control or trigger the start of a pivot movement of the plough tool carrier 24 when lifting the plough 10. The latch mechanism 84 comprises a control lever 86 located on the support member 14 and pivotally attached to a blocking linkage 90 on the bottom side of the support member 14. The blocking linkage 90 extends to both ends of the arcuate frame portion 80 and engages the sliding front end 82 of the plough tool carrier 24 when reaching its operating positions on the respective arcuate frame portion end. The blocking linkage 90 comprises two angular links 92 and 94, respectively pivotally connected medially of their ends with center pivots 96 and 98 on opposite sides of the front frame support member 14 and being pivotally connected to each other at overlapping slots 100 provided in respective inner ends thereof by a pivot pin 102 located half-way between opposite ends of the support member 14 and half-way between the pivots 96 and 98, wherein the outer ends of the links 92 and 94 respectively form arcuate recesses 104 and 106 shaped to form the blocking ends for engaging a roller 107 carried at the front end 82 of the plough tool carrier 24. The pivoting control lever 86 is rigidly connected to the center pivot 96 of the angular link 92, with the link 92 likewise being fixed to the center pivot 96. When pivoting the control lever 86 in the direction indicated by arrow 108, the angular link 92 will be pivoted moving the blocking end recess 104 towards the front end of the frame 11 into a forwardly shifted position from its blocking engagement with the roller 107 at the front end of the tool carrier 24, thereby causing a movement of the connected ends 100 of the angular links 92, 94 links towards the rear of the frame 11 and thereby moving the blocking end recess 106 of the other angular link 94 towards the front of the frame 11 into a forwardly shifted position. Therefore, by pivoting the control lever 86 to an unblocking direction, indicated by arrow 108, the plough tool carrier 24 will be released. Pivoting the control lever 86 back will latch the plough tool carrier 24 on its sliding front end 82, noting that this is accomplished by merely releasing the control lever 86 from the unblocking position whereupon a coil tension spring 109 connected between the angular links 92 and 94 will cause the links 92 and 94 to be pivoted together thus returning the blocking end recesses 104 and 106 to their respective blocking positions with the spring 109 permitting the roller 107 to contact and deflect one or the other of the links 92 and 94 and respectively move into blocked engagement with one or the other of the recesses 104 and 106.

Reversing the plough 10 can be initiated by lifting the frame 11 at the 3-point attachment points 16, 18 and 20. When lifting the plough 10 from the ground, the lower links of the 3-point hitch on the tractor (not shown) move up. The upper link of the 3-point hitch moves automatically away from the front end of the frame 11 towards the tractor. The bolt 50 of the control link 38 is thereby placed in one of the slot end notches 64, 66. The control link 38 will be pulled and a force will be created due to gravity of the plough 10. This force creates a torque around the vertical pivot axle 22 as described above. When releasing the latch mechanism 84, the torque will cause the plough tool carrier 24 to pivot around the vertical pivot axle 22. When the plough tool carrier 24 reaches its reverse position the latch mechanism 84 will be activated towards the blocking position and the plough 10 will then be lowered. The upper link of the 3-point hitch will automatically move back turning the former drag force into a compressing force and moving the control link 38 towards the control plate 44, where the control link 38 starts to slide along the guide slot 48 from the one slot end 58, 60 to the opposite slot end 60 or 58, respectively. When the plough 10 starts to be lifted again for reaching the next reverse position, the same movements will take place in the opposite direction starting with the bolt 50 of the control link 38 in slot end notch 66 or 64, respectively.

When pivoting the plough 10 from one operating position into the reverse operating position the gauge wheel 74 will be turned automatically from its one operating side to the reverse operating side by a wheel reversing link arrangement. The wheel reversing link arrangement comprises a control link 110 placed between the frame 11 and a first pivot arm 112 of a horizontal pivot plate 114. A second pivot arm 116 extends from the pivot plate 114 and engages a guide slot arm 118 which is pivotally supported on the rear end of the plough tool carrier 24 and slidably guided by the pivot arm 116. The support 72 of gauge wheel 74 is connected to the pivot arm 116 on the guide slot arm 118. According to the movement of the plough tool carrier 24 the control link 110 will pull on the first pivot arm 112 when the pivot plate 114 starts moving with the rear end of the plough tool carrier 24 and pivots the second arm 116. The second arm 116 will slide towards the pivot of the guide slot arm 118, thereby pivoting it around the end of the plough tool carrier 24 and turning it towards the reverse operating position.

Having described the reversible plough 10, it will become apparent that various modifications can be made without departing from the scope of the accompanying claims.

What is claimed is:

1. A reversible plough comprising:
    a frame having a front end portion and a rear end portion, with the front end portion including a horizontal, transverse front frame support having top and bottom sides and the frame further having an upright support fixed to, and projecting upwardly from the top side of the front frame support at a location located centrally between opposite first and second ends of the front frame support;
    a lower first 3-point hitch attachment point and a lower second 3-point hitch attachment point respectively fixed to first and second locations of the front frame support spaced equally from said upright support for attachment to a 3-point hitch;
    a vertical pivot plate assembly carrying an upper third 3-point hitch attachment point, together with an upper rear pivot point spaced rearward of the third 3-point hitch attachment point and a lower pivot point, with the lower pivot point being attached to a lower location of said upright support and establishing a horizontal transverse pivot axis about which said vertical pivot plate assembly is adapted to pivot forwardly in response to the frame being lifted by a tractor 3-point hitch and is adapted to pivot rearwardly in response to the frame being lowered by a tractor 3-point hitch;
    a vertical pivot axle being fixed on the rear end portion of said frame;
    an elongate plough tool carrier having front and rear ends and being pivotally mounted, medially the front and rear ends, on said vertical pivot axle for horizontal pivotal movement between a first work position, wherein the front end of the plough tool carrier is adjacent the first end of said transverse front frame support, and a second work position, wherein the front end of the plough tool carrier is adjacent the second end of said transverse front frame support;
    a link arrangement being pivotally mounted on said vertical pivot axle above said plough tool carrier; and
    a control link having a first end pivotally coupled to the upper rear pivotal connection of said vertical pivot plate assembly and having a second end slidably connected to the link arrangement which is pivotally supported by said vertical pivot axle and connected to said plough tool carrier.

2. The reversible plough of claim 1, wherein said link arrangement further comprises:
    a bushing received on said vertical pivot axle for pivotable movement about said pivot axle;
    a control plate rigidly connected to said bushing, wherein said control plat comprises a guide slot, with said control link including a fastener at a rear end thereof which is connected to the control plate for sliding in said guide slot; and
    a control arm rigidly connected to said bushing, wherein said control arm is connected to said plough tool carrier.

3. The reversible plough of claim 2, wherein said guide slot further comprises at last two slot ends.

4. The reversible plough of claim 1, further comprising:
at last two plough tools;
at last two pivot supports respectively connected to said at last two plough tools and being mounted to said carrier for pivoting about respective upright axes, with at last on of the two pivot supports being spaced forward of the vertical pivot axle and serving to couple said control arm to said plough tool carrier; and
at least on pivot arm connected to each of the at least two pivot supports, wherein a connecting link connects said at last two pivot supports together to simultaneously transfer force from said vertical pivot axle to said two pivot supports.

5. The reversible plough of claim 4, further comprising a gauge wheel and an additional pivot support supporting said gauge wheel to said carrier for pivoting about an additional upright axis.

6. The reversible plough of claim 1, further comprising an arcuate frame portion configured at a radius about said vertical pivot axle and the front end of said plough tool carrier being supported for movement along said arcuate frame portion.

7. The reversible plough of claim 6, further comprising a latch mechanism being releasably engaged with the plough tool carrier for securing the plough tool carrier in one of the first and second work positions and the latch mechanism being selectively operable to release the plough tool carrier when pivotal movement of said plough tool carrier to another of said first and second work positions is desired.

8. The reversible plough of claim 7, further comprising:
said latch mechanism including a control lever connected to the front frame support; and a blocking linkage located on the bottom side of the front frame support and connected to the control lever for being operated between engaged and released positions, wherein said blocking linkage extends to both ends of said arcuate frame portion and is normally in the engaged position wherein it engages the front end of said plough tool carrier when the plow tool carrier is in a selected one of the first and second work positions.

9. The reversible plough of claim 8, further comprising:
said blocking linkage including first and second angular links, with each of the angular links being mounted medially between inner and outer ends therof to the front frame support of the front end portion of said frame for pivoting about respective first and second center pivots and the inner ends of the first and second angular links being pivotally connected to each other and the outer ends of the first and second angular links being configured for engaging the plough carrier tool and blocking movement of said plough carrier tool from said selected one of the first and second work positions.

10. The reversible plough of claim 9, wherein said control lever is rigidly connected to the first center pivot, with the first center pivot being fixed to said first angular link, said control lever and first and second angular links being configured such that movement of the control lever from a normal position to an operating position will cause the first angular link and second angular link to be respectively pivoted in opposite first and second directions about the first and second center pivots thereby moving the outer ends of the first and second angular links from their respective blocking positions to respective released positions; and a return spring being connected to the first and second angular links for acting, once the control lever is released from its operating position, to simultaneously return the outer ends of the angular links to their respective blocking positions and return the control lever to its normal position.

11. A reversible plough comprising:
a frame having a front end portion and a rear end portion, with the front end portion including a transverse front frame support having opposite first and second ends and a top side and a bottom side;
a lower first attachment point and a lower second attachment point mounted to the bottom side of the transverse front frame support for attachment to a 3-point hitch;
an upright mast fixed to the top side of the transverse front frame support at a location medially of the first and second ends of the front frame support;
a vertical pivot plate assembly having a lower end pivotally connected to a lower location of said mast and defining a horizontal transverse pivot axis about which the vertical pivot plate assembly may pivot fore-and-aft;
an upper third attachment point located at an upper front location of the vertical pivot plate assembly for attachment to said 3-point hitch;
a vertical pivot axle fixed on the rear end portion of said frame;
a plough tool carrier pivotally mounted on said vertical pivot axle, at a location medially of front and rear ends of the plough tool carrier, for movement between first and second work positions of the plow tool carrier;
a gauge wheel including an upright wheel support mounted on said plough tool carrier for pivoting about an upright axis;
a link arrangement defining a bell crank which is pivotally supported by said vertical pivot axle and includes a control arm conned to said plough tool carrier at a location spaced from said vertical pivot axle, and further includes a control plat located above said control arm and defining a transverse guide arrangement having opposite ends;
a first control link having a forward end coupled to an upper rear location of said pivot plat assembly and a rear end coupled to the control plat for sliding between the opposite ends of the transverse guide arrangement in response to forward pivoting movement of said vertical pivot plat arrangement about said horizontal transverse axis in response to the first, second and third attachment points being raised by the 3-point hitch, with the sliding movement of the rear end of the control arm effecting pivoting of said bell crank so as to transfer a force to the plow tool carrier causing it to pivot about said vertical pivot axle from on of said first and second work positions to the other of said first and second work positions; and
a second control link forms part of a wheel reversing link arrangement and is connected to said frame and to a second link arrangement pivotally carried by the plow tool carrier and coupled to said upright wheel support for reversing said gauge wheel in response to said plow tool carrier pivoting between the first and second work positions.

12. The reversible plough of claim 11, wherein said second link arrangement includes a horizontal pivot plat pivotally mounted to the plow tool carrier and having a first pivot arm and a second pivot arm, wherein said second control link is connected to said first pivot arm; and said wheel reversing linkage further including a slot guide arm, wherein said slot guide arm engages said second pivot arm and is pivotally supported on the rear end of said plough tool carrier by said upright wheel support.

* * * * *